US010384683B2

(12) United States Patent
Kapadia et al.

(10) Patent No.: US 10,384,683 B2
(45) Date of Patent: Aug. 20, 2019

(54) RETRACTABLE VEHICLE CONTROL

(71) Applicant: Ford Global Technologies, LLC, Dearborn, MI (US)

(72) Inventors: Jimmy Kapadia, Ottawa Hills, OH (US); Brett Stanley Hinds, Clarkston, MI (US); Nayaz Khalid Ahmed, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 123 days.

(21) Appl. No.: 15/467,067

(22) Filed: Mar. 23, 2017

(65) Prior Publication Data
US 2018/0273035 A1    Sep. 27, 2018

(51) Int. Cl.
| | |
|---|---|
| *B60W 10/20* | (2006.01) |
| *B60W 30/18* | (2012.01) |
| *B60W 10/18* | (2012.01) |
| *G05D 1/00* | (2006.01) |
| *B62D 1/00* | (2006.01) |
| *B60K 26/02* | (2006.01) |

(52) U.S. Cl.
CPC .......... *B60W 30/18* (2013.01); *B60K 26/02* (2013.01); *B60W 10/18* (2013.01); *B60W 10/20* (2013.01); *B62D 1/00* (2013.01); *G05D 1/0088* (2013.01); *B60W 2400/00* (2013.01); *B60W 2520/00* (2013.01); *B60W 2710/18* (2013.01); *B60W 2710/20* (2013.01)

(58) Field of Classification Search
CPC ...... B60W 30/18; B60W 10/18; B60W 10/20; G05D 1/0088

USPC .......................................................... 701/23
See application file for complete search history.

(56) References Cited

U.S. PATENT DOCUMENTS

| | | | |
|---|---|---|---|
| 4,008,778 A | 2/1977 | Mitchell | |
| 4,924,960 A | 5/1990 | Crill | |
| 5,657,828 A * | 8/1997 | Nagamachi | B60L 50/52 180/19.3 |
| 6,308,792 B1 * | 10/2001 | Garrett | B62D 51/04 180/19.3 |
| 6,758,291 B1 | 7/2004 | Koch | |
| 7,314,116 B2 * | 1/2008 | David | B62B 3/0612 180/19.2 |

(Continued)

FOREIGN PATENT DOCUMENTS

| | | |
|---|---|---|
| DE | 102014212274 A1 | 12/2015 |
| EP | 2617627 B1 | 11/2012 |
| WO | WO 2016185151 A1 | 11/2016 |

OTHER PUBLICATIONS

Land Rover, "Land Rover Autonomous Car Technology," Jun. 15, 2015; 4 pages.

*Primary Examiner* — Thomas G Black
*Assistant Examiner* — Wae L Louie
(74) *Attorney, Agent, or Firm* — Frank A. MacKenzie; Bejin Bieneman PLC

(57) ABSTRACT

A system includes an elongate member having a connection end electrically coupleable to an attachment point at an external surface of a vehicle. The system includes a motion sensor arranged to detect motion of the elongate member. The system includes a computer that is programmed to actuate one or more subsystems in the vehicle including at least one of steering, braking, and a powertrain, based on received motion data from the motion sensor.

20 Claims, 6 Drawing Sheets

(56) References Cited

U.S. PATENT DOCUMENTS

| | | | |
|---|---|---|---|
| 7,628,239 B1* | 12/2009 | Louie | B62D 1/00 180/167 |
| 8,991,529 B2* | 3/2015 | Bryant | B62D 51/04 180/19.2 |
| 9,522,624 B1 | 12/2016 | Williams | |
| 2002/0148657 A1 | 10/2002 | Tyson | |
| 2004/0245030 A1* | 12/2004 | Holtan | B62B 3/1404 180/19.1 |
| 2005/0103541 A1 | 5/2005 | Nelson | |
| 2007/0272452 A1 | 11/2007 | Nicholes | |
| 2008/0039264 A1 | 2/2008 | Araki | |
| 2008/0308325 A1 | 12/2008 | Hart | |
| 2009/0076664 A1 | 3/2009 | McCabe et al. | |
| 2010/0123294 A1* | 5/2010 | Ellington | B62B 3/007 280/47.371 |
| 2010/0314180 A1 | 12/2010 | Ziv-Av | |
| 2011/0054717 A1 | 3/2011 | Yamauchi et al. | |
| 2012/0138374 A1* | 6/2012 | Pezzuti | B60S 13/00 180/15 |
| 2014/0202779 A1* | 7/2014 | Bryant | B62D 51/04 180/19.3 |
| 2015/0066274 A1* | 3/2015 | Hijikata | B62B 5/0073 701/22 |
| 2015/0127208 A1 | 5/2015 | Jecker et al. | |
| 2016/0062354 A1 | 3/2016 | Li | |
| 2016/0089283 A1 | 3/2016 | DeLuca et al. | |

\* cited by examiner

RETRACTABLE VEHICLE CONTROL

BACKGROUND

An autonomous vehicle, sometimes referred to as a self-driving vehicle, may operate partially or entirely without user intervention. For example, a vehicle computer may control vehicle operations such as steering, acceleration, braking, etc. Thus, an autonomous vehicle may lack controls found in non-autonomous vehicles to allow a user to control vehicle movement, e.g., an autonomous vehicle may lack one or more of a vehicle steering wheel, brake pedal, and/or accelerator pedal, etc.

DETAILED DESCRIPTION

Introduction

Figure 1A:
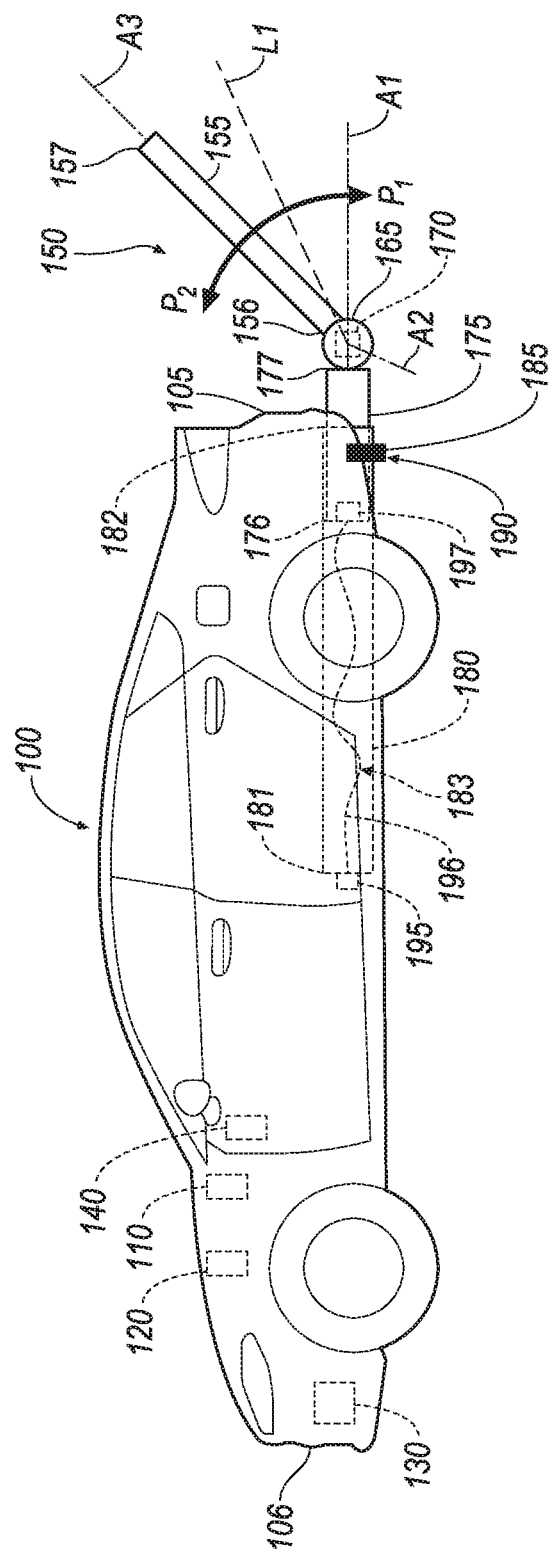
FIG. 1A is a perspective view of an example vehicle control device attached to an example vehicle.

Disclosed herein is an elongate member having a connection end electrically coupleable to an attachment point at an external surface of a vehicle, and one or more motion sensors arranged to detect one or more movements of the elongate member. Further, a computer can be programmed to receive motion data, i.e., data about one or more movements of the elongate member, from the motion sensor(s), and to actuate vehicle subsystems, including a steering, braking, and/or powertrain, according to the motion data.

The motion data may include an angle of movement of the elongate member, and the computer may be further programmed to actuate the one or more subsystems at least in part based on the angle of movement.

The motion data may include an angle of movement that is an angle of deviation from an axis extending from the attachment point.

The motion data may further include an angle of rotation of the elongate member and the computer may be further programmed to actuate a vehicle actuator to move in one of a forward and reverse direction based on the angle of rotation.

The elongated member may have a default position and the computer is further programmed to actuate a vehicle brake actuator to stop the vehicle upon determining that the elongated member is in the default position.

The system may further include one or more second motion sensors in addition to the motion sensor.

The system may further include a vehicle receptacle and the attachment point is mountable to the vehicle receptacle. The system may further include a sliding member fittable to the vehicle receptacle, wherein the attachment point moveably couples the elongated member and the sliding member.

The attachment point may further include a coupling that releaseably and moveably couples the elongated member to the external surface of the vehicle.

The elongated member may have a deployed position and a stowed position.

The motion data may further include a movement of the elongated member in a plane parallel to a ground surface and extending from the external attachment point.

The motion data may further include a movement of the elongated member in a plane perpendicular to the ground surface and extending from the attachment point.

Further disclosed herein is a method including electrically coupling a connection end of an elongate member to an attachment point at an external surface of a vehicle, wherein a motion sensor is arranged to detect motion of the elongate member, and based on received motion data from the motion sensor, actuating one or more subsystems in the vehicle including at least one of steering, braking, and a powertrain.

The method may further include actuating the one or more subsystems at least in part based on an angle of movement of the elongated member, wherein the motion data includes the angle of movement of the elongate member.

The motion data may further include an angle of movement that is an angle of deviation from an axis extending from the attachment point.

The motion data may further include actuating a vehicle actuator to move in one of a forward and reverse direction based on an angle of rotation of the elongated member, wherein the motion data further includes the angle of rotation of the elongate member.

The attachment point may include a coupling that releaseably and moveably couples the elongated member to the external surface of the vehicle.

The elongated member may have a deployed position and a stowed position.

The motion data may further include a movement of the elongated member in a plane parallel to a ground surface and extending from the external attachment point.

The motion data may further include a movement of the elongated member in a plane perpendicular to the ground surface and extending from the attachment point.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

Figure 1B:
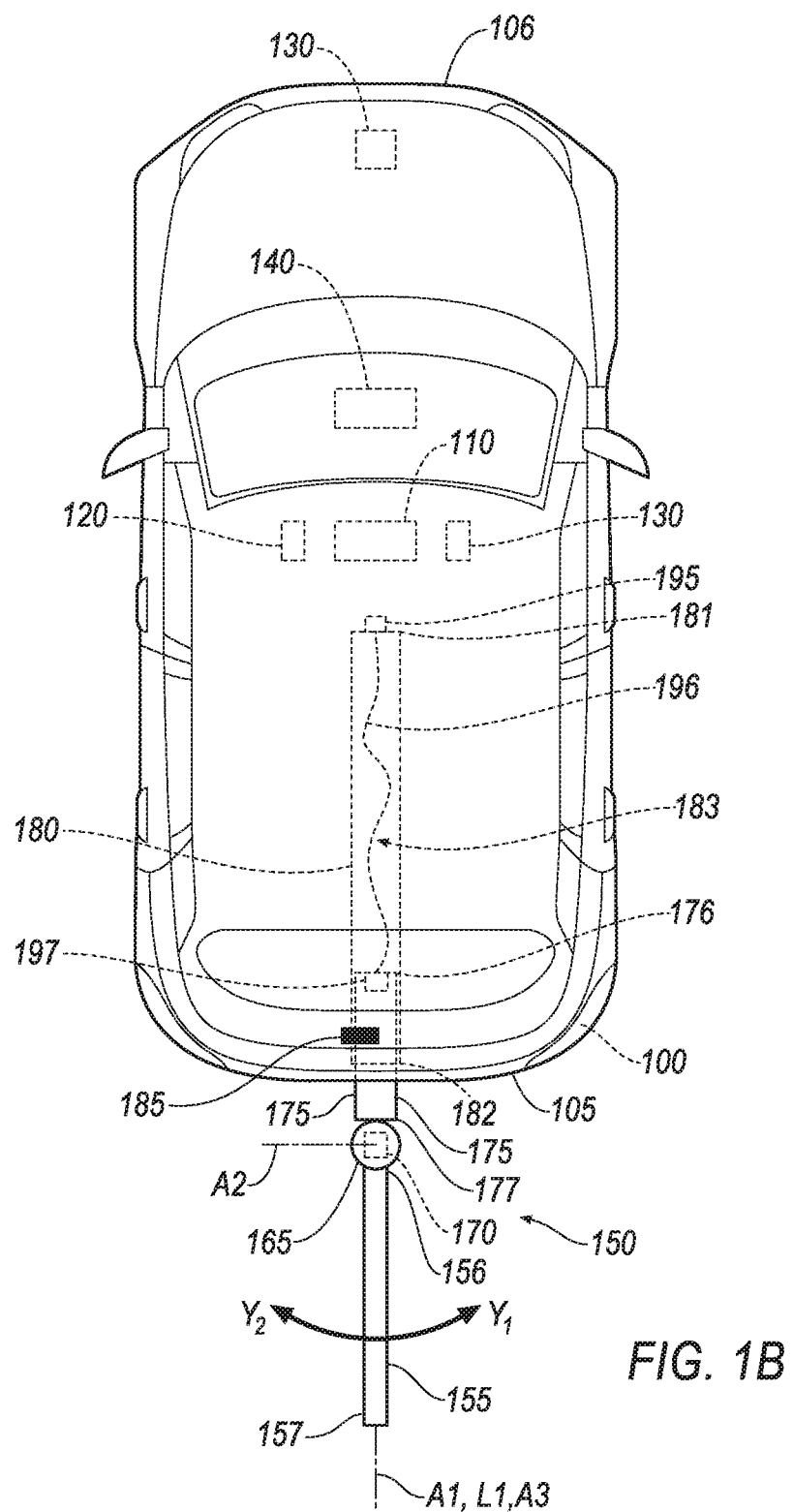
FIG. 1B is a top view of the vehicle and the vehicle control device of FIG. 1A.
Figure 1C:
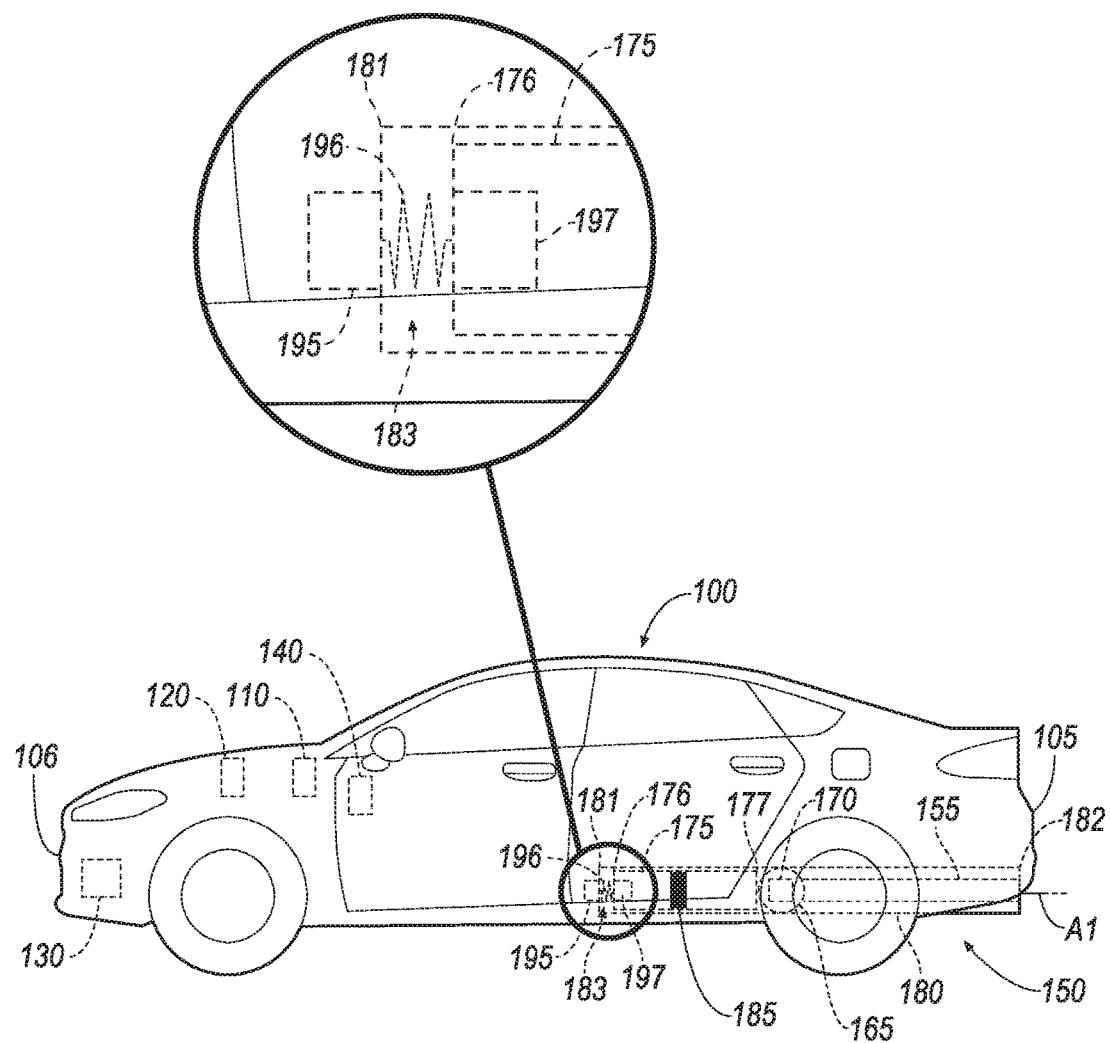
FIG. 1C is a perspective view of the vehicle control device of FIGS. 1A-1B disposed in a receptacle of the vehicle.

FIGS. 1A-1C show an example control device 150 attached to a vehicle 100. FIGS. 1A and 1B show the control device 150 in a deployed position, i.e., positioned for use. FIG. 1C, on the other hand, shows the control device 150 in a stowed position, i.e., retracted in a receptacle 180 provided within a vehicle 100 frame. The control device 150 includes an elongated sliding member 175 fittable to the receptacle 180 and an elongated member 155 moveably coupled, as further described below, to the sliding member 175 and fittable to the receptacle 180.

The vehicle 100 may be powered in a variety of known ways, e.g., with an electric motor and/or internal combustion engine. The vehicle 100 may be a land vehicle such as a car, truck, etc. As depicted in FIGS. 1A-1C, a vehicle 100 may include a computer 110, actuator(s) 120, and sensor(s) 130.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous, semi-autonomous mode, or non-autonomous mode. For purposes of this disclosure, an autonomous mode is defined as one in which each of vehicle 100 propulsion, braking, and steering are controlled by the computer 110; in a semi-autonomous mode, the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, a sensor 130, etc. Alternatively or additionally, in cases where the computer 110 comprises multiple devices, the vehicle 100 communication network may be used for communications between devices represented as the computer 110 in this disclosure. Further, as mentioned below, various controllers and/or sensors may provide data to the computer 110 via the vehicle communication network.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100.

Vehicle 100 sensors 130 may include a variety of devices known to provide data via the vehicle communications bus. For example, the sensors may include one or more cameras, radars, and/or Light Detection and Ranging (LIDAR) sensors 130 disposed in and/or on the vehicle 100 providing data encompassing at least some of the vehicle 100 exterior. A vehicle 100 computer 110 may receive the object data and operate the vehicle in an autonomous and/or semi-autonomous mode based at least in part on the received object data.

The vehicle 100 may include a human machine interface (HMI) 140 that is configured to receive information from a user, such as a human operator, during operation of the vehicle. For example, a user may select a mode of operation, e.g., an autonomous mode, by inputting a requested mode of operation via a user interface device. Moreover, a user interface device may be configured to present information to the user. Thus, an HMI 140 may be located in a passenger compartment of the vehicle 100. In an example, the computer 110 may output information indicating that a vehicle 100 mode of operation such as an autonomous mode is deactivated due to, e.g., receiving control instructions from the control device 150 (as discussed below).

An autonomous vehicle 100 may lack a steering wheel, an accelerator and/or brake pedal because a computer 110 may operate the vehicle 100 without user input. However, in various circumstances, such as a failure in a sensor 130, a computer 110, etc., and/or during maintenance or repair in a service center, etc., an autonomous vehicle 100 may be operated in a non-autonomous mode. Thus, user inputs including a steering angle, an acceleration request, and/or a brake pressure may be provided via the control device 150.

The control device 150 is typically attached to the vehicle 100 receptacle 180 as a means for a user to provide such inputs. As shown in FIGS. 1A-1C, the control device 150 includes the elongate member 155 having a first end 156 electrically coupleable to the receptacle 180. When the device 150 is in the deployed position, this electrical coupling is at an external surface 105 of a vehicle 100. In the context of this disclosure, "at" the external surface 105 means located substantially flush with, or slightly extending from, the vehicle 100 external body surface 105. That is, it is intended that the device 150 in the deployed position be positioned as with one end moveably coupled to the vehicle 100 so that the user perceives that the control device 150 member 155 is a level or control arm that has an attachment point flush with the vehicle 100 external surface 105.

The device 150 includes one or more motion sensors 170 mounted to, or arranged, e.g., on the vehicle 100 body or frame so as to sense movement of, the elongate member 155. A vehicle 100 computer 110 may be programmed to receive motion data from the motion sensor 170, and to actuate one or more subsystems in the vehicle 100 including at least one of a steering, braking, and a powertrain. Thus, advantageously, a user may steer, accelerate, and/or stop the vehicle 100 via the control device 150 while standing/walking outside the vehicle 100.

To attach the control device 150 to the vehicle 100, the vehicle 100 may include a receptacle 180. An example receptacle 180 may have an elongated shape with a longitudinal axis A1 that is substantially parallel to a vehicle 100 body longitudinal axis. The receptacle 180 may have a cavity 183 with a first end 181 and a second end 182. The receptacle 180 includes walls defining the cavity 183 with an opening at the second end 182. The opening at the second end 182 may have a rectangular, triangular, circular, etc., cross section, typically depending on a cross-sectional shape of the device 150 member 155.

The receptacle 180 opening at the second end 182 allows for inserting the control device 150 into the receptacle 180. The receptacle 180 second end 182 may be disposed at a rear external surface 105 and/or a front end external surface 106 of the vehicle. By mechanically engaging the control device 150 to the receptacle 180, e.g., when engagement pin(s) 185 are locked in place, the control device 150 may be immobile relative to the receptacle 180. Additionally or alternatively, the receptacle 180 cavity 183 may include grooves, ribs, ridges, protrusions, etc. (not shown) on interior surfaces of walls to improve an alignment of the control device 150 relative to the receptacle 180. The receptacle 180 may be mechanically supported by, e.g., a beam of a vehicle 100 frame. In one example, the receptacle 180 may be attached to a vehicle 100 beam, e.g., with screws, clips, etc. The receptacle 180 may be formed of metal, hard plastic, etc.

An engagement pin 185 is releaseably lockable to a receptacle 180 locking hole 190. "Releaseably lockable," in the context of this disclosure, means "having a locked and an unlocked (or released) position." The engagement pin 185 accordingly may be movable between a locked position and an unlocked (or released) position. As an example, moving between the locked and released positions may include pushing/pulling the device 150 sliding member 175 to/away from the receptacle 180, or a combination thereof.

In one example, the receptacle 180 may include a locking means, which in one example are hole(s) 190 on the receptacle 180 walls to mechanically engage the control device 150 sliding member 175 with the receptacle 180. The receptacle 180 may include one or more holes 190.

The sliding member 175 may be mechanically and electrically engagable by the receptacle 180. The sliding member 175 may have rectangular, triangular, circular, etc. solid cross-sectional shape, i.e., typically a shape fittable to the shape of the opening of the receptacle 180. In one example, size and shape of the sliding member 175 and the receptacle 180 are respectively provided such that the control device 150 sliding member 175, when inserted, cannot rotate about the longitudinal axis A1 of the receptacle 180, e.g., rectangular or triangular.

In one example, the control device 150 sliding member 175 is rendered substantially immovable relative to the receptacle 180 when locked, e.g., by the control device 150 engagement pins 185 and receptacle 180 holes 190. In one example, the sliding member 175 may include springs that bias the engagement pins 185 outwardly, i.e., away from the sliding member 175. Thus, when the pins are aligned with the holes 190, the pins 185 may be pushed outwardly to enter the holes 190 (e.g., the locked position). In one example, a user may push the pins 185 inwardly (i.e., toward the sliding member 175) to unlock the sliding member 175 and slide the sliding member 175 toward the cavity 183 first end 181.

The elongated member 155 with a first and second ends 156, 157 may have a triangular, rectangular, circular, etc. cross section, as described above. The elongated member 155 first end 156 may be attached to the motion sensor 170. As shown in FIGS. 1A-1C, the elongated member 155 may fittable in the receptacle 180. Additionally or alternatively, the elongated member 155 may be storable separately from the receptacle 180, e.g., in a vehicle 100 trunk. Additionally or alternatively, the vehicle 100 may lack a receptacle 180 and/or the elongated member 155 may be moveably mountable to the vehicle 100 external surface 105, e.g., via an attachment point 165 supported by the external surface 105. In such example, the control device 150 may lack the sliding member 175.

The attachment point 165 may be mechanically engage the sliding member 175 second end 177 and the elongated member 155 first end 156. The motion sensor 170 may provide multiple degrees of freedom (e.g. joystick sensors such as are known) for movements of the elongated member 155 relative to the receptacle 180. The attachment point 165 may include a cage or the like with ball bearings or any other type of mechanical coupling allowing multiple degrees of freedom for the member 155 relative to the receptacle 180. As stated above, the vehicle 100 may lack a receptacle 180. In such case, the attachment point 165 may be supported by the vehicle 100 external surface 105, e.g., flush with the vehicle 100 bumper. Thus, the attachment point 165 may provide multiple degrees of freedom of movement for the member 155 relative to the vehicle 100. In one example, the attachment point 165 may include releaseably lockable coupling(s) that allow a release and/or attachment of the elongated member 155 from/to the sliding member 175. Additionally or alternatively, a mechanical coupling between the elongated member 155 and the sliding member 175 may be releaseably lockable, e.g., via a click locking mechanism, screws, etc.

Each of a plurality of motion sensors 170 can be mounted to, e.g., the member 155 or the attachment point 165, and are typically associated with determining a specific movement of the elongated member 155. The sensors 170 may be mechanical, magnetic, inductive, optical, or another type of sensor, such as is known to detect movement of one part in one or more directions relative to another, e.g., movement of the member 155 relative to the attachment point 165. For example, the sensors 170 may include optical rotational sensors, rotational potentiometers, gyroscopes, etc. In one example, the sensors 170 may be disposed inside a coupling attachment point 165 and determine a movement of the member 155 relative thereto, and hence relative to the vehicle 100, inasmuch as the attachment point 165 is typically fixed with respect to the vehicle 100. For example, a gyroscope sensor 170 may determine an inclination of the elongated member 155 with respect to a horizontal plane. An optical rotational sensor 170 may determine a rotational angle of the elongated member 155 relative to a plane, e.g., horizontal or vertical. As discussed below, the sensors 170 may be configured to determine a combination of one or more of movements of the member 155 in various directions, e.g., a diagonal movement of the elongated member 155 relative to the vehicle 100.

As discussed above, the attachment point 165 may provide multiple degrees of freedom like a joystick. Thus, for example, the sensors 170 may determine any movement of the member 155 relative to the vehicle 100. In one example, one motion sensor 170 may determine a movement with respect to a horizontal plane (e.g., along an arc shown with $Y_1$, $Y_2$ in FIG. 1B), whereas another motion sensor 170 identifies a movement with respect to a vertical plane (e.g., along an arc shown with $P_1$, $P_2$ in FIG. 1A). For example, the elongated member 155 may be mechanically pivotable about an attachment point 165 at the receptacle 180 axis A1. Additionally or alternatively, the elongated member 155 may be pivotable about an axis A2 that is parallel to a ground surface. In one example, a motion sensor 170 such as a joystick sensor may determine a movement in accordance to multiple degrees of freedom provided by the attachment point 165. A joystick sensor in the context of present disclosure includes a base and a stick moveably mounted to the base. The joystick sensor may determine an angle and/or a direction of the stick relative to the base. In one example, the base of the joystick sensor is supported by the attachment point 165 and the stick is coupled to the elongated member 155. For example, the sensor 170 may determine a diagonal movement of the member 155 relative to the horizontal and vertical planes. In one example, the motion sensor 170 may be configured to determine three dimensional coordinates of the elongated member 155, e.g., second end 157 relative to the attachment point 165. Additionally or alternatively, the elongated member 155 may be rotatable about a longitudinal axis A3 of the elongated member 155.

To electrically couple the receptacle 180 to the control device 150, the receptacle 180 may include a first electric connector 195 mounted at the cavity 183 first end 181. To provide electrical connection between the control device 150 and electrical components of the vehicle 100, a vehicle 100 wire harness may be electrically connected to the receptacle 180 first electric connector 195. The control device 150 may include a second electrical connector 197 mounted to a first end 176 of the sliding member 175. The device second electrical connector 197 is electrically couplable to a second or receptacle electrical connector 195, e.g., via wiring 196. Additionally or alternatively, the sliding member 175 may include electrical conductive material (not shown) in contact with electrically conductive material on interior walls of the receptacle 180.

The control device 150 may have a deployed position (see FIGS. 1A-1B) and a stowed position (see FIG. 1C). In the stowed position, the sliding member 175 and at least a substantial portion, e.g., 80% of longitudinal length, of the elongated member 155 are disposed inside the receptacle 180. In the deployed position, the pin(s) 185 is/are in a locked position (as described above), the elongated member 155 is disposed outside the receptacle 180, and the elongated member 155 is moveable about at least one of the axes A1, A2, A3. The vehicle 100 may be controlled based on motion data received from the motion sensor(s) 170 when the control device 150 is in the deployed position.

As discussed above, the computer 110 may be programmed to actuate the vehicle 100 actuators 120 based on motion data received from the motion sensor(s) 170. In one example, the motion data may include an angle of rotation of the elongate member. As shown in FIG. 1A, the motion data may include an angle associated with a movement with respect to a vertical plane (e.g., along an arc shown with $P_1$, $P_2$ in FIG. 1A). Thus, the motion data may include an acute angle formed between the elongated member 155 axis A3 and the axis A1. In another example, as shown in FIG. 1B, the motion data may include an angle associated with a movement with respect to a horizontal plane (e.g., along an arc shown with $Y_1$, $Y_2$ in FIG. 1B). Thus, the motion data may include an acute angle formed between the elongated member 155 axis A3 and the receptacle 180 longitudinal axis A1. The computer 110 may be programmed to actuate, e.g., a vehicle 100 actuator 120, according to such angle of movement. In another example, the motion data may include an angle of rotation of the elongated member 155 about the axis A3 (i.e., twisting the elongated member 155). Motion data may include data associated with one or more of movements described above, e.g., depending on degrees of freedom that the attachment point 165 coupling provides. As discussed above, the motion sensor 170 may determine a movement of the elongated member 155 that includes multiple degrees of freedom. For example, the computer 110 may be programmed to actuate vehicle 100 actuators 120 based on a determined diagonal movement of the elongated member 155. In one example, the computer 110 may be programmed to actuate the vehicle 100 steering actuator 120 based on a horizontal component of the determined diagonal movement of the member 155. The computer 110 may be further programmed to actuate vehicle 100 actuators 120 to move the vehicle forward or backward, and/or brake based on a vertical component of the determined diagonal movement of the member 155.

In another example, the motion data may include an angle of deviation from, e.g., an a "default position" that may be represented by a line L1. The line L1 may be an extension of the axis A1 extending from the receptacle 180, or could be defined in some other orientation. For example, the line L1 may form a 45-degree angle with the ground surface and be on a plane passing through the vehicle 100 center and perpendicular to the ground surface. The default position is a position of the member 155 to which it defaults or returns when no user input is being applied, i.e., received. Thus, the computer 110 may be programmed to interpret a deviation of elongated member 155 longitudinal axis A3 away from the line L1 as a user input such as to move the vehicle 100 forward, backward, steer left or right, and/or brake. The motion sensor 170 may include mechanical biasing means, e.g., a leaf spring, etc., to hold the elongated member 155 longitudinal axis A3 at the default position indicated by the line L1, when the control device 150 is in the deployed position and the user does not apply any force to the elongated member 155.

The computer 110 may be programmed to perform vehicle 100 operation by actuating vehicle 100 actuators 120 at least in part based on the motion data. For example, the computer 110 may be programmed to actuate a vehicle 100 actuator 120 to move the vehicle 100 in a forward direction upon determining that an angle of movement of the elongated member 155 about the axis A2 relative to the line L1 exceeds a predetermined threshold angle, e.g., 5 degrees. Thus, the computer 110 may actuate the vehicle 100 actuator 120 to move the vehicle 100 in a forward direction upon determining a movement of the elongated member 155 with respect to the axis A2 in the direction $P_2$ that results in, e.g., an angle of 10 degrees relative to the line L1.

Additionally or alternatively, the computer 110 may be programmed to adjust a speed and/or an acceleration of the vehicle 100 based on an angle of movement of the elongated member 155 about the axis A2 relative to the line L1. For example, the computer 110 may be programmed to proportionally increase the vehicle 100 speed based on an increase of the angle of the member 155 about the axis A2 relative to the line L1. Additionally, when the vehicle 100 is controlled based on input received from the control device 150, the computer 110 may be programmed to limit a maximum speed of the vehicle 100 to a maximum speed threshold, e.g., 7 km/hr.

Additionally or alternatively, the computer 110 may be programmed to actuate the vehicle 100 actuators 120 to move in a forward or a reverse direction based on a direction of movement of the member 155 about the axis A2 relative to the line L1. For example, the computer may be programmed to actuate the vehicle 100 actuators 120 to move in a reverse direction, upon determining that a movement of the member 155 resulted in placing the member 155 between the ground surface and the line L1. The computer 110 may be programmed to actuate the vehicle 100 actuators 120 in a forward direction when determined that a movement of the member 155 about Axis A2 resulted in placing the member 155 between the vehicle 100 trunk and the line L1.

In another example, the computer 110 may be programmed to actuate a vehicle 100 brake actuators 120 upon determining that the angle is less than a predetermined threshold, e.g., −5 degrees (minus indicates movement in $P_1$ direction, where plus indicates movement in $P_2$ direction). Thus, the computer 110 may actuate the vehicle 100 actuators 120 to move the vehicle 100 in a reverse direction upon determining that an angle of the elongated member 155 movement with respect to the axis A2 in a $P_1$ direction is less than −5 degrees.

In another example, the computer 110 may be programmed to actuate the brake actuator 120 to stop the vehicle 100 upon determining that the elongated member 155 is in the default position. In one example, the attachment point 165 may include one or more spring(s) or other biasing mechanism that moves the elongated member 155 to the default position and biases the member 155 to remain in the default position when the user does not apply any force to the elongated member 155. Thus, advantageously, when the elongated member 155 is unattended (the user does not apply any force that moves the elongated member 155 away from the default position), the computer 110 actuates the vehicle 100 brake actuator 120 to stop the vehicle 100.

To steer the vehicle 100, the computer 110 may be programmed to actuate a vehicle steering actuator 120 based on motion data received from the motion sensor 170. For example, based on angle of rotation of the elongated member 155 about the axis A3. In this example, the computer 110 is programmed to steer the vehicle 100 to a right or left directions based on motion data including a clockwise or a counter-clockwise rotation of the elongated member 155 about the axis A3.

In another example, the computer 110 may be programmed to actuate the vehicle 100 actuators 120 to steer the vehicle 100 based on motion data including a movement of the elongated member 155 in a direction $Y_1$, $Y_2$ with respect to the longitudinal axis A1. In this example, a movement of the elongated member 155 in a $Y_1$, $Y_2$ may cause steering of the vehicle 100 in a right or left direction respectively, As discussed above, the control device 150 may have a stowed and a deployed position. For example, if the vehicle 100 is operated in an autonomous mode, the control device 150 may be in the stowed position. In one example, the computer 110 may be programmed to determine whether the control device 150 elongated member 155 is in the deployed position, e.g., based on data received from a sensor 130 mounted to the receptacle 180 that identifies a location of the sliding member 175 within the receptacle 180. For example, the computer 110 may determine that the control device 150 is in the stowed position upon determining that a distance between the cavity 183 first end 181 and the sliding member 175 first end 176 is less than a distance threshold, e.g., 5 cm. Additionally or alternatively, the control device 150 may be stowed in a vehicle 100 trunk, in a garage or shop, etc., e.g., when the vehicle 100 lacks a receptacle 180. In another example, the member 155 may be foldable and may have a folded and an extended position. For example, the member 155, in a folded position (not shown), may be disposed in a vehicle body cavity or the like and may have a surface flush with one or both of the vehicle 100 exterior surfaces 105, 106.

In another example, the computer 110 may be programmed to determine whether the control device 150 is the deployed position, upon determining that the pin 185 is in a locked position, e.g., based on data received from a sensor 130 mechanically coupled to the pin 185. The computer 110 may be further programmed to perform the vehicle 100 operation based on received motion data from the motion sensor 170 only when determined that the elongated member 155 is in the deployed position. Additionally, the computer 110 may be programmed to output a request for approval to the vehicle 100 HMI 140 upon determining that the control device 150 is in the deployed position. In this example, the computer 110 may be programmed to perform vehicle 100 operation based on motion data, only if input is received from the HMI 140 approving the operation.

Additionally, the computer 110 may be programmed to actuate a vehicle 100 brake actuator 120 to stop the vehicle 100 upon determining that a time-to-collision to an object, e.g., another vehicle, is less than a predetermined time-to-collision threshold, e.g., 1 second, and/or upon determine, while the vehicle 100 is moving, that an object is within a predetermined distance of the vehicle 100 so as to pose a risk of collision. Known techniques can be used for interpreting vehicle 100 sensor data to provide a time-to-collision and/or a warning that a surrounding object is close to the vehicle 100 and/or poses a risk of collision. Thus, advantageously, even when the vehicle 100 is controlled based on input received from the control device 150, the computer 110 may be programmed to prevent a collision of the vehicle 100 with another object based on data received from the vehicle 100 sensors 130 such as a LIDAR sensor 130. Additionally, the computer 110 may be programmed to actuate a vehicle 100 sound generating actuator 120 when the time-to-collision is determined to be less than the time-to-collision threshold.

Process

Figure 2:
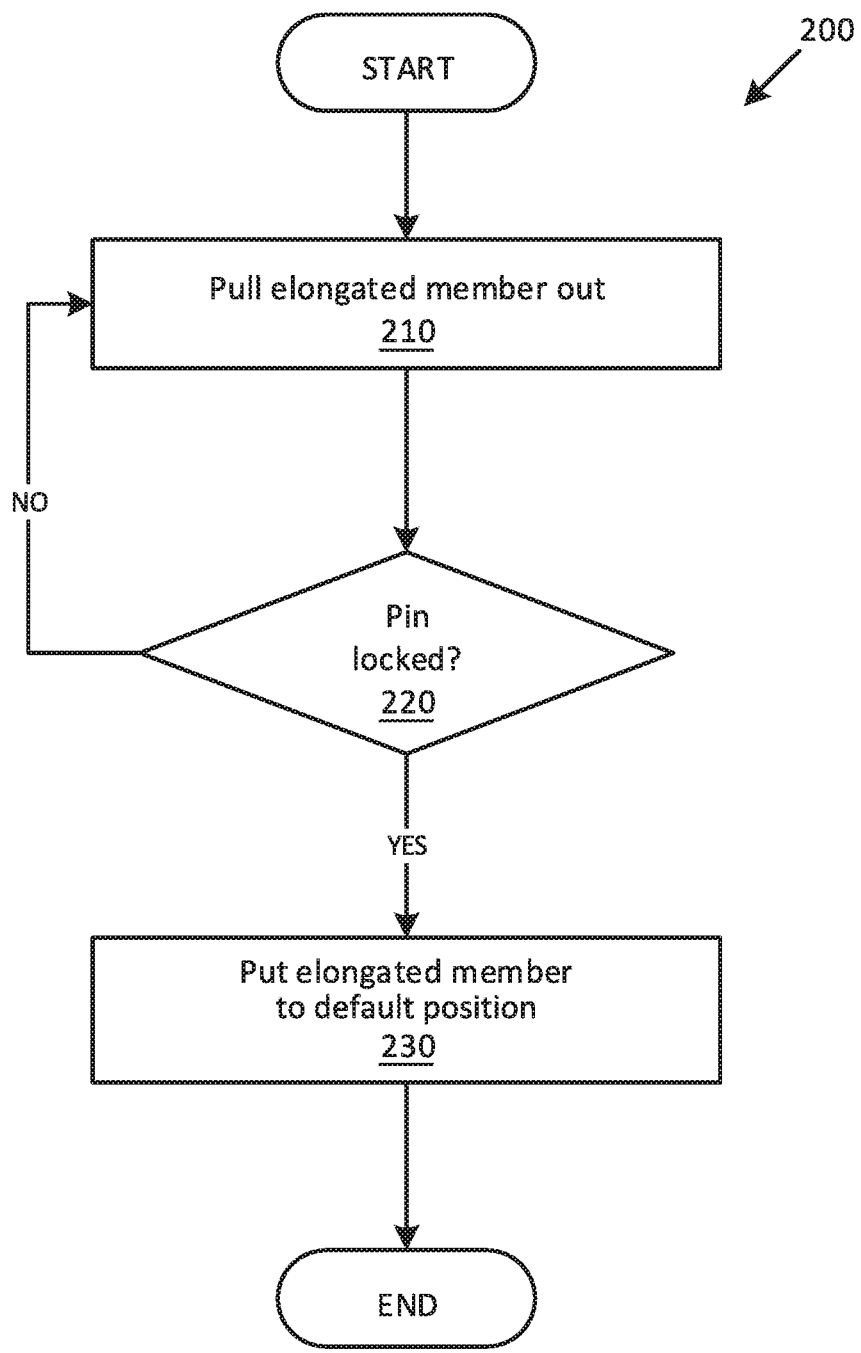
FIG. 2 is a flowchart of an example process of putting the vehicle control device in a deployed position.

FIG. 2 shows a flowchart of an example process 200 for moving the control device 150 to the deployed position.

The process 200 begins in a block 210, in which a user pulls the elongated member 155 out of the receptacle 180. The elongated member 155 may have a hook or handle at the second end 157 to hold the elongated member 155 while pulling it out. In one example, the user may open a cap that is removeably mounted to the receptacle 180 second end 182, and then pull the elongated member 155 out until the pins 185 are locked. Additionally or alternatively, the user may retrieve the control device 150 from a vehicle 100 trunk, a storage, etc., and mount the device 150 to the attachment point 165. Alternatively, when the member 155 is foldable, the user may pull the folded member 155 to unfold to an extended position.

Next, in a decision block 220, the user determines whether the pin(s) 185 is/are locked. For example, the user may determine that the pins 185 are in the locked position based on a clicking sound caused when the pin 185 is inserted in the hole 190. Additionally or alternatively, the user may determine that the pin 185 is in the locked position based on visually determining that the pin 185 protrudes outward through the hole 190. If the user determines that the pin 185 is locked, then the process 200 proceeds to a block 230; otherwise the process 200 returns to the block 210.

In the block 230, the user moves the elongated member 155 to a default position. For example, as shown in FIG. 1A, a default position may be defined as a position in which the elongated member 155 longitudinal axis A3 is placed in a direction of a line L1. The user may actuate a spring, and/or any other mechanical adjustment included in the motion sensor 170 to place the elongated member 155 in the default position.

Following the block 230, the process 200 ends.

Figure 3:
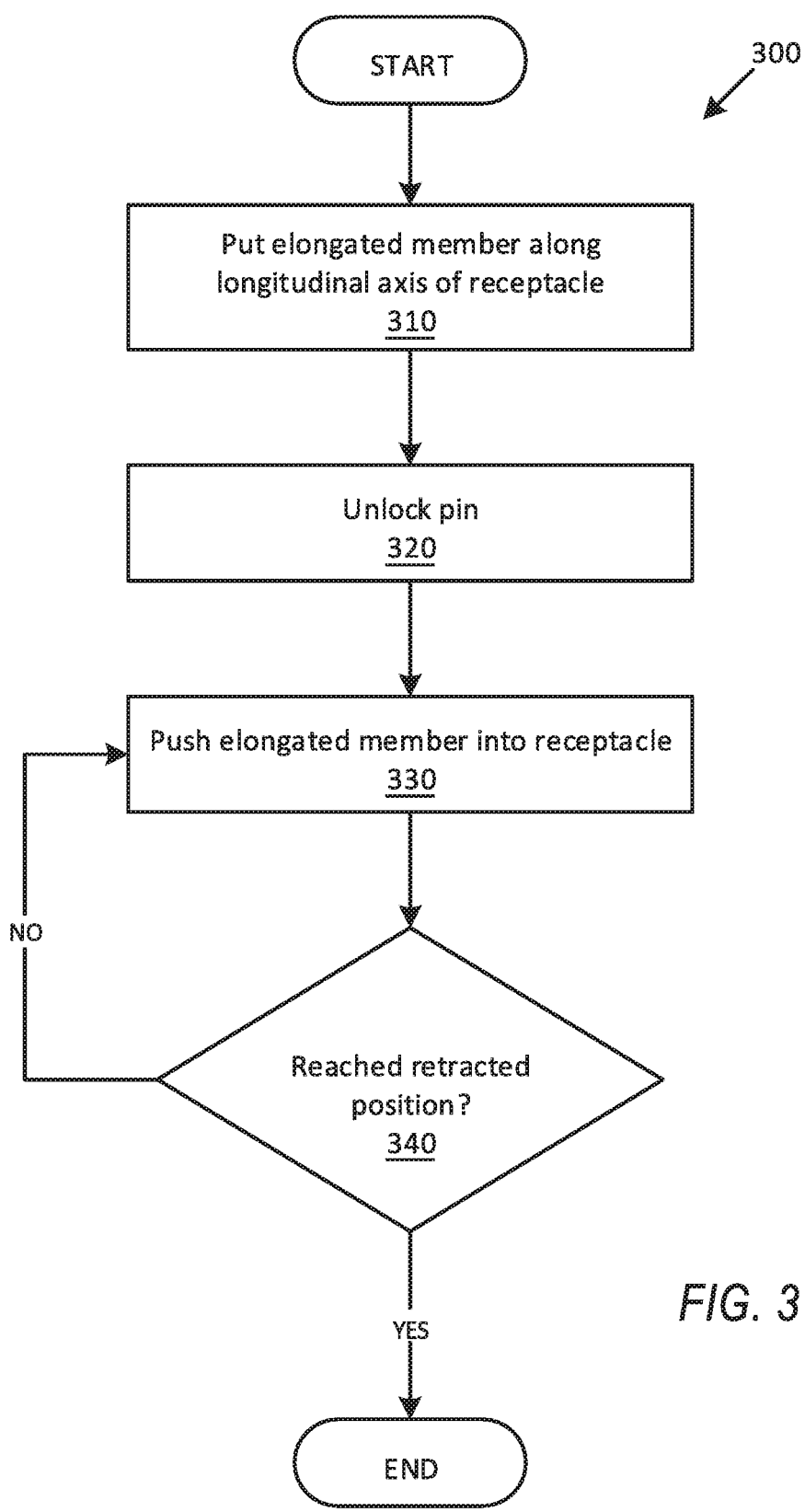
FIG. 3 is a flowchart of an example process of putting the vehicle control device in the stowed position.

FIG. 3 shows a flowchart of an example process 300 for moving the control device 150 to the stowed position.

The process 300 begins in a block 310, the user puts the elongated member 155 in the direction of the receptacle 180 longitudinal axis A1. For example, the user releases a spring, clip, etc. of the motion sensor 170 which holds the elongated member 155 in the default position and keep the elongated member 155 in a direction of the axis A1.

Next, in a block 320, the user unlocks the pin(s) 185. For example, the user may push the pins 185 inwardly (e.g., toward the axis A1) to release the sliding member 175 from the locked position.

Next, in a block 330, the user pushes (slides) the elongated member 155 and the sliding member 175 into the receptacle 180. If the member 155 is foldable, the member 155 may be pushed to the folded position. In one example, the member 155 in the folded position may be flushed with the vehicle 100 exterior surface 105, 106.

Next, in a decision block 340, the user determines whether the control device 150 is in the stowed position. For example, the user may determine that the device 150 is in the stowed position upon determining that the elongated member 155 second end 157 has reached the receptacle 180 second end 182. If the user determined that the device 150 is in the stowed position, then the process 300 ends; otherwise the process 300 returns to the block 330.

Figure 4:
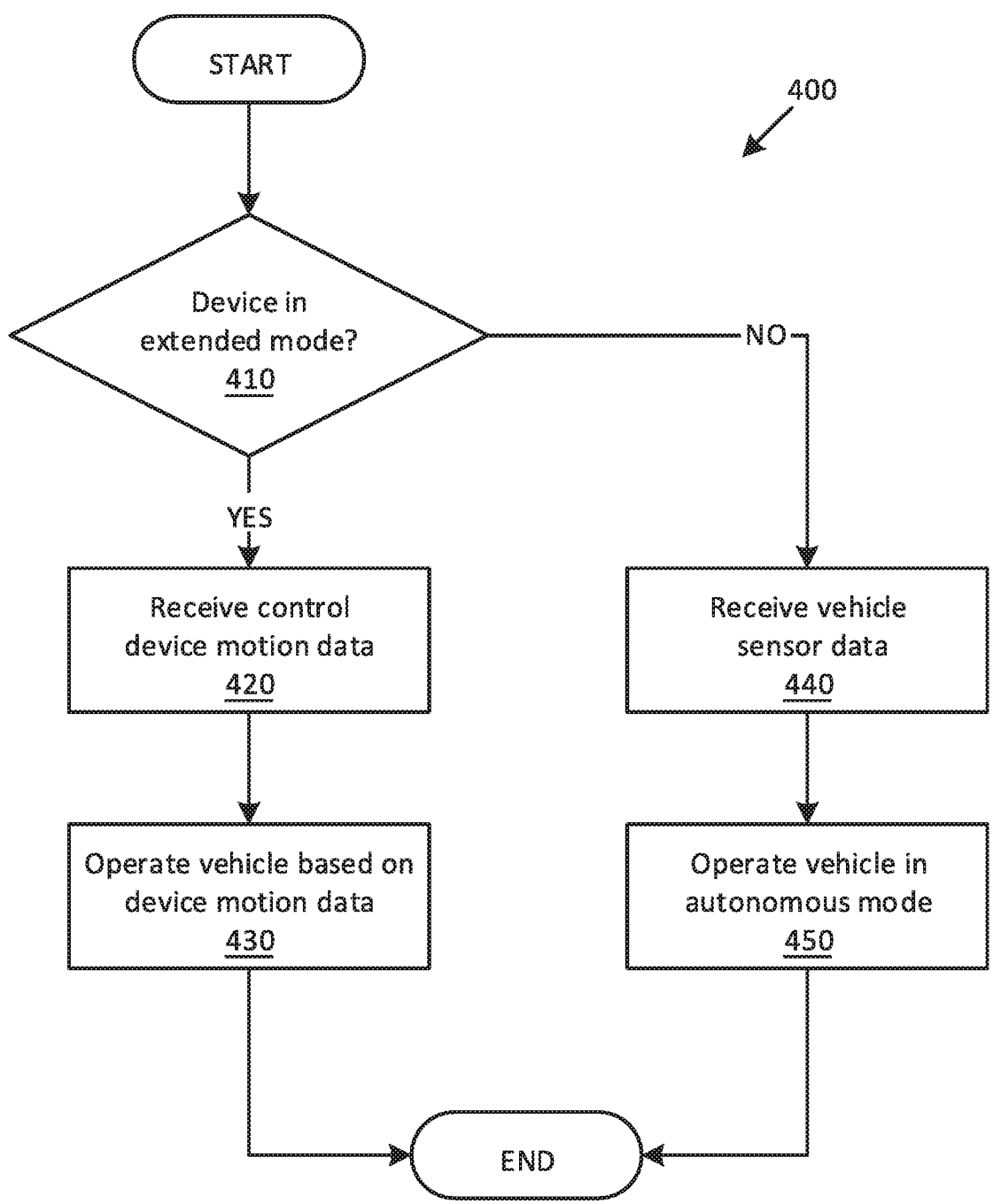
FIG. 4 is a flowchart of an example process to control vehicle operation.

FIG. 4 shows a flowchart of an example process 400 for controlling vehicle 100 operation. For example, the vehicle 100 computer 110 can be programmed to execute blocks of the process 400.

The process 400 begins in a decision block 410, in which the computer 110 determines whether the control device 150 is in the deployed mode. In one example, the computer 110 may be programmed to determine that the device 150 is in the deployed position upon determining that the pin 185 is in the locked position. Additionally or alternatively, the computer 110 may determine that the device 150 is in the deployed position based on data received from the motion sensor(s) 170, e.g., data indicating that the elongated member 155 is in the default position. In another example, e.g., when the vehicle 100 lacks a receptacle 180, the computer 110 may be programmed to determine whether the elongated member 155 is connected to the attachment point 165. If the computer 110 determines that the device 150 is in the deployed position, then the process 400 proceeds to a block 420; otherwise the process 400 proceeds to a block 440.

In the block 420, the computer 110 receives motion data from the control device 150 motion sensor(s) 170.

Next, in a block 430, the computer 110 operates the vehicle 100 based on the received motion data based on a movement of the elongated member 155 relative to the vehicle 100. For example, the computer 110 may be programmed to actuate vehicle 100 actuators 120 based on the received motion data to move forward, move backward, steer, and/or brake. The computer 110 may be programmed to prevent a vehicle 100 movement upon determining that the motion data does not include any user input.

Further, the computer 110 may be programmed to actuate a vehicle 100 brake actuator 120 when the elongated member 155 is in the default position. Additionally, the computer 110 may be programmed to prevent a collision of the vehicle 100 with an object based on data received from, e.g., a vehicle 100 LIDAR sensor 130 based on vehicle 100 sensor 130 data. For example, the computer 110 may be programmed to ignore (or override) an input received from the control device 150 and actuate a vehicle 100 brake actuator 120 when determined based on the LIDAR sensor 130 that a time-to-collision with an object, e.g., another vehicle, is less than a predetermined time-to-collision threshold, e.g., 1 second.

Following the block 430, the process 400 ends, or alternatively, returns to the decision block 410, although not shown in FIG. 4.

In the block 440, the computer 110 receives vehicle 100 sensor 130 data. For example, the computer 110 may be programmed to receive data from sensors 130 such as a LIDAR sensor 130, camera sensor 130, etc. The receives sensor 130 data may include location, size, type, etc. of other objects around the vehicle 100.

Next, in a block 450, the computer 110 operates the vehicle 100 in an autonomous mode. For example, the computer 110 may be programmed to navigates the vehicle 100 based on the received sensor data. Alternatively, the vehicle 100 may be operated in a semi-autonomous mode. Following the block 450, the process 400 ends, or alternatively, returns to the decision block 410, although not shown in FIG. 4.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising:
   an elongate member having a connection end electrically coupleable to an attachment point at an external surface of a vehicle;
   a motion sensor arranged to detect motion of the elongate member; and
   a computer, programmed to, based on received motion data from the motion sensor, actuate one or more subsystems in the vehicle including a steering, a powertrain and, when the elongated member is in a default position, a braking.

2. The system of claim 1, wherein the motion data includes an angle of movement of the elongate member, and the computer is further programmed to actuate the one or more subsystems at least in part based on the angle of movement.

3. The system of claim 1, wherein the motion data includes an angle of movement that is an angle of deviation from an axis extending from the attachment point.

4. The system of claim 1, wherein the motion data further includes an angle of rotation of the elongate member and the computer is further programmed to actuate a vehicle actuator to move in one of a forward and reverse direction based on the angle of rotation.

5. The system of claim 1, further comprising one or more second motion sensors in addition to the motion sensor.

6. The system of claim 1, further comprising a vehicle receptacle and the attachment point is mountable to the vehicle receptacle.

7. The system of claim 6, further comprising a sliding member fittable to the vehicle receptacle, wherein the attachment point moveably couples the elongated member and the sliding member.

8. The system of claim 7, wherein the computer is further programmed to determine that the control device is in the stowed position upon determining that a distance between a cavity first end and a sliding member first end is less than a distance threshold; the cavity being defined by walls of the vehicle receptacle.

9. The system of claim 1, wherein the attachment point further includes a coupling that releaseably and moveably couples the elongated member to the external surface of the vehicle.

10. The system of claim 1, wherein the elongated member has a deployed position and a stowed position.

11. The system of claim 1, wherein the motion data further includes a movement of the elongated member in a plane parallel to a ground surface and extending from the attachment point.

12. The system of claim 1, wherein the motion data further includes a movement of the elongated member in a plane perpendicular to a ground surface and extending from the attachment point.

13. A method, comprising:
    electrically coupling a connection end of an elongate member to an attachment point at an external surface of a vehicle, wherein a motion sensor is arranged to detect motion of the elongate member; and
    based on received motion data from the motion sensor, actuating one or more subsystems in the vehicle including a steering, a powertrain and, when the elongated member is in a default position, a braking.

14. The method of claim 13, further comprising actuating the one or more subsystems at least in part based on an angle of movement of the elongated member, wherein the motion data includes the angle of movement of the elongate member.

15. The method of claim 13, wherein the motion data further includes an angle of movement that is an angle of deviation from an axis extending from the attachment point.

16. The method of claim 13, further comprising actuating a vehicle actuator to move in one of a forward and reverse direction based on an angle of rotation of the elongated member, wherein the motion data further includes the angle of rotation of the elongate member.

17. The method of claim 13, wherein the attachment point includes a coupling that releaseably and moveably couples the elongated member to the external surface of the vehicle.

18. The method of claim 13, wherein the elongated member has a deployed position and a stowed position.

19. The method of claim 13, wherein the motion data further includes a movement of the elongated member in a plane parallel to a ground surface and extending from the external attachment point.

20. The method of claim 13, wherein the motion data further includes a movement of the elongated member in a plane perpendicular to a ground surface and extending from the attachment point.

* * * * *